United States Patent
Jung et al.

(10) Patent No.: US 11,622,157 B2
(45) Date of Patent: Apr. 4, 2023

(54) DISPLAY APPARATUS AND OPERATING METHOD OF THE SAME

(71) Applicant: Samsung Electronics Co., Ltd., Suwon-si (KR)

(72) Inventors: Wootak Jung, Suwon-si (KR); Hyunuk Tak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/037,283

(22) Filed: Sep. 29, 2020

(65) Prior Publication Data

US 2021/0144445 A1    May 13, 2021

(30) Foreign Application Priority Data

Nov. 8, 2019   (KR) .......................... 10-2019-0142995

(51) Int. Cl.
*H04N 5/445* (2011.01)
*H04N 21/482* (2011.01)
(Continued)

(52) U.S. Cl.
CPC ......... *H04N 21/4828* (2013.01); *G06V 20/46* (2022.01); *H04N 21/435* (2013.01);
(Continued)

(58) Field of Classification Search
CPC .......... H04N 21/4828; H04N 21/4316; H04N 21/4334; H04N 21/4821; H04N 21/435;
(Continued)

(56) References Cited

U.S. PATENT DOCUMENTS 7,161,619 B1 * 1/2007 Niida ................. H04N 5/23203
                                                    382/167
7,657,905 B2 * 2/2010 Kimoto ............. H04N 21/4821
                                                    725/44
(Continued)

FOREIGN PATENT DOCUMENTS

KR    10-2015-0137499 A    12/2015
KR    10-2016-0146311 A    12/2016
KR       10-1980430 B1     5/2019

*Primary Examiner* — Annan Q Shang

(57) ABSTRACT

A display apparatus includes a communicator configured to communicate with an external apparatus, a memory storing one or more instructions, and a processor. The processor may be configured to execute the one or more instructions to control the communicator to receive data regarding frames forming each of a plurality of pieces of broadcast content in a normal mode; extract first object information based on the data; and provide information about broadcast content corresponding to a keyword of interest of a user from among the pieces of broadcast content, based on the first object information. When entering a suspended mode from the normal mode, the processor may be configured to control the communicator to receive second object information in the suspended mode, and provide the information about the broadcast content corresponding to the keyword of interest from among the pieces of broadcast content, based on the second object information.

16 Claims, 12 Drawing Sheets

(51) Int. Cl.
| | |
|---|---|
| *H04N 21/431* | (2011.01) |
| *H04N 21/433* | (2011.01) |
| *H04N 21/435* | (2011.01) |
| *G06V 20/40* | (2022.01) |

(52) U.S. Cl.
CPC ..... *H04N 21/4316* (2013.01); *H04N 21/4334* (2013.01); *H04N 21/4821* (2013.01)

(58) Field of Classification Search
CPC .......... H04N 21/4826; H04N 21/8405; H04N 21/4432; H04N 21/4825; G06K 9/00744; G06F 16/483
See application file for complete search history.

(56) References Cited

U.S. PATENT DOCUMENTS

| | | | |
|---|---|---|---|
| 9,704,021 B2 | 7/2017 | Kang | |
| 10,069,769 B2 | 9/2018 | Dong et al. | |
| 2003/0202775 A1* | 10/2003 | Junkersfeld | H04N 21/4147 386/E5.052 |
| 2011/0154398 A1* | 6/2011 | Nishigai | H04N 5/782 725/40 |
| 2012/0124620 A1* | 5/2012 | Nishizawa | H04N 21/488 725/34 |
| 2012/0272271 A1* | 10/2012 | Nishizawa | H04N 21/4312 725/40 |
| 2015/0301836 A1* | 10/2015 | Chung | H04N 21/4432 713/2 |

* cited by examiner

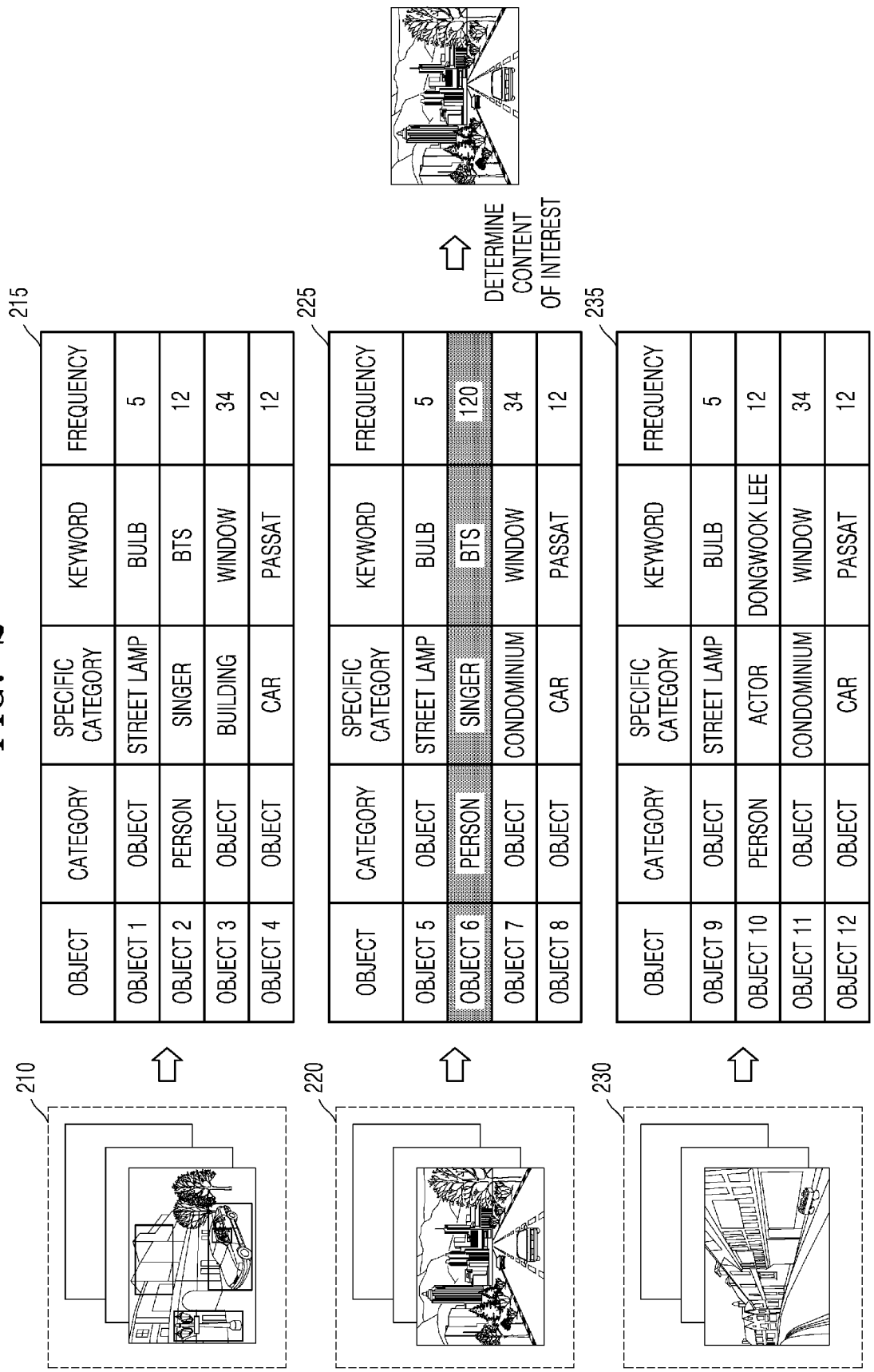

DISPLAY APPARATUS AND OPERATING METHOD OF THE SAME

CROSS-REFERENCE TO RELATED APPLICATION

This application is based on and claims priority under 35 U.S.C. § 119 to Korean Patent Application No. 10-2019-0142995, filed on Nov. 8, 2019, in the Korean Intellectual Property Office, the disclosure of which is herein incorporated by reference in its entirety.

BACKGROUND

1. Field

The disclosure relates to a display apparatus and an operating method of the same, and more particularly, to a display apparatus for providing information about broadcasting content related to a keyword of interest of a user and an operating method of the same.

2. Description of Related Art

A broadcast receiving apparatus is an apparatus having a function of receiving and displaying a broadcast image viewable by a user. The user may view a broadcast on the broadcast receiving apparatus. The broadcast receiving apparatus displays, on a display, a broadcast selected by the user among broadcast signals transmitted from a broadcasting station. Also, a smart television (TV) providing various types of content in addition to a broadcasting function has been provided. The smart TV does not operate manually according to the user's selection, but aims at analyzing and providing what the user wants without the user's operation.

Moreover, a user of a TV is provided with various programs and content via the TV, but it is difficult to be suitably provided with a program or content the user desires from among numerous broadcasting channels and contents. For example, when information about broadcast content to be transmitted is verified by using an electronic program guide (EPG) service, details of the broadcast content is inferred only via a broadcast title or the like; and an object appearing on a screen, such as a character, an object, a background, or music of the broadcast content, cannot be verified. Also, there is a limit to finding a channel having information desired by a user by identifying broadcast content of all channels one by one.

SUMMARY

Provided are a display apparatus capable of providing information about broadcast content corresponding to a keyword of interest registered by a user not only when a display is turned on, but also when the display is turned off; and an operating method of the display apparatus.

Additional aspects will be set forth in the description which follows, while other aspects will be apparent from the description or may be learned through practice of the presented embodiments of this disclosure.

According to an embodiment of the disclosure, a display apparatus includes: a communicator configured to perform communication with an external apparatus; a memory storing one or more instructions; and a processor configured to execute the one or more instructions stored in the memory to: control the communicator to receive data regarding frames forming, each of a plurality of pieces of broadcast content in a normal mode; extract first object information about one or more objects included in the frames, based on the data regarding the frames; provide information about broadcast content corresponding to a keyword of interest of a user from among the plurality of pieces of broadcast content, based on the first object information; and when entering a suspended mode from the normal mode, control the communicator to receive second object information about the one or more objects in the suspended mode, and provide the information about the broadcast content corresponding to the keyword of interest from among the plurality of pieces of broadcast content, based on the second object information.

The display apparatus may further include a display, wherein the display is in an on state in the normal mode and is in an off state in the suspended mode.

Each of the first object information and the second object information may include at least one of appearance frequency information, keyword information, or category information regarding each of one or more objects included in the frames.

The processor may be further configured to execute the one or more instructions to, based on the first object information and at least one of broadcast time information, channel information, or category information of each of the plurality of pieces of broadcast content, determine the broadcast content corresponding to the keyword of interest from among the plurality of pieces of broadcast content.

The information about the broadcast content may include at least one of channel information, broadcast time information, category information, viewing target age information, or a broadcast content name of the broadcast content.

The display apparatus may further include a display, wherein the processor is further configured to execute the one or more instructions to determine whether each of the plurality of pieces of broadcast content is the broadcast content corresponding to the keyword of interest, based on the first object information, and control the display to display the information about the broadcast content corresponding to the keyword of interest.

The processor may be further configured to execute the one or more instructions to, when the display is in an off state, turn on the display and control the display that is turned on to display the information about the broadcast content corresponding to the keyword of interest.

The processor may be further configured to execute the one or more instructions to determine whether each of the plurality of pieces of broadcast content is the broadcast content corresponding to the keyword of interest, based on the first object information, and control the communicator to transmit the information about the broadcast content corresponding to the keyword of interest to an electronic apparatus interworking with the display apparatus.

The processor may be further configured to execute the one or more instructions to determine whether each of the plurality of pieces of broadcast content is the broadcast content corresponding to the keyword of interest, based on the first object information, and records the broadcast content corresponding to the keyword of interest for a pre-set time and stores the recorded broadcast content.

The processor may be further configured to execute the one or more instructions to register the keyword of interest by receiving information about the keyword of interest, wherein the information about the keyword of interest may include at least one of information about a target channel where the keyword of interest is to be searched for, a notification method of the broadcast content corresponding to the keyword of interest, or information about whether to record the broadcast content corresponding to the keyword of interest.

The processor may be further configured to execute the one or more instructions to control the communicator to transmit the keyword of interest to the external apparatus in the suspended mode, receive the information about the broadcast content corresponding to the keyword of interest from the external apparatus, and provide the information about the broadcast content.

According to another embodiment of the disclosure, an operating method of a display apparatus, the operating method includes: receiving data regarding frames forming, each of a plurality of pieces of broadcast content in a normal mode; extracting first object information about one or more objects included in the frames, based on the data regarding the frames; providing information about broadcast content corresponding to a keyword of interest of a user from among the plurality of pieces of broadcast content, based on the first object information; when entering a suspended mode from the normal mode, receiving second object information about the one or more objects in the suspended mode; and providing the information about the broadcast content corresponding to the keyword of interest from among the plurality of pieces of broadcast content, based on the second object information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a diagram for describing a method, performed by a display apparatus, of collecting and analyzing object information from frame data of broadcast content, according to an embodiment of the disclosure;

DETAILED DESCRIPTION

Figure 1:
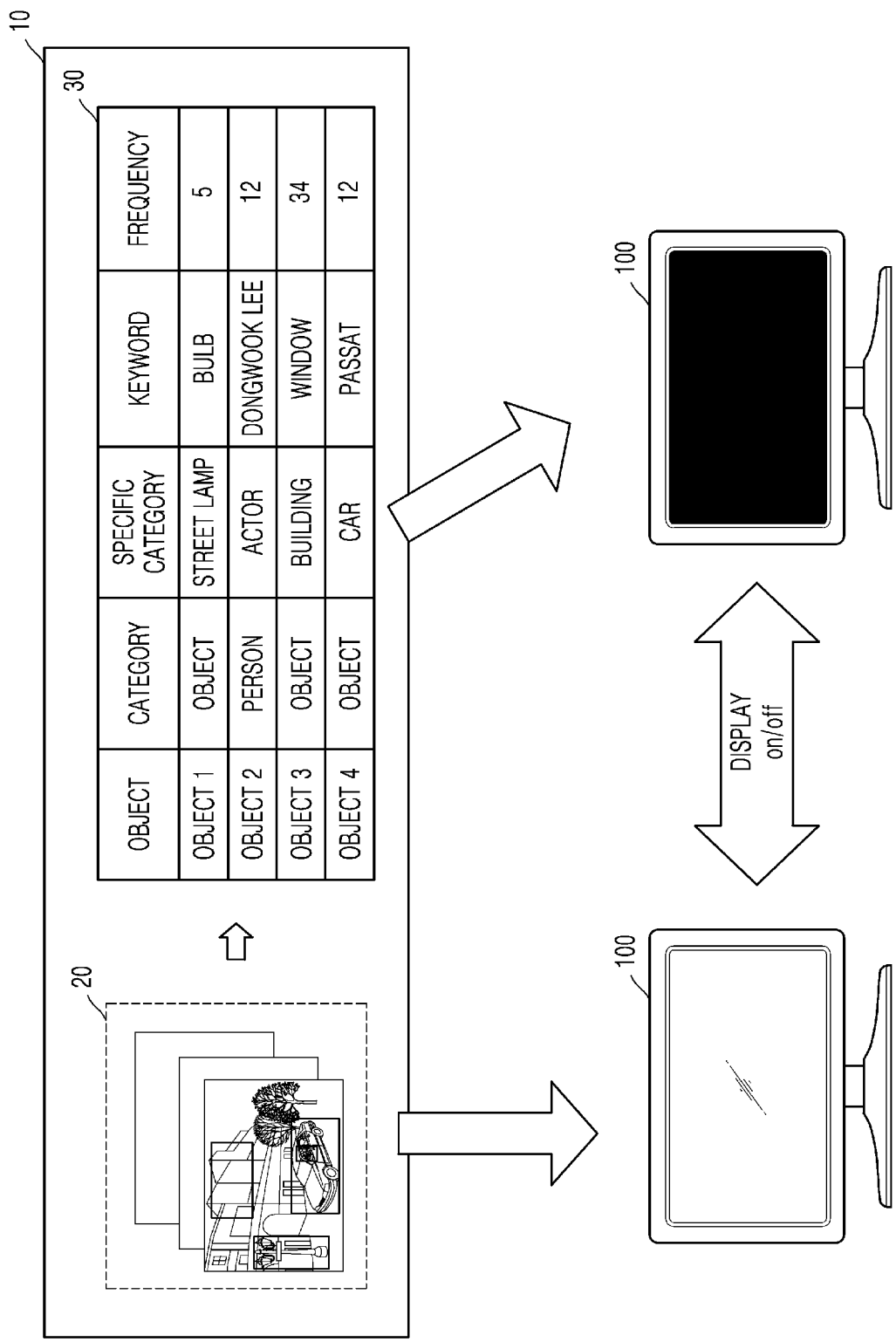
FIG. 1 illustrates a diagram for describing a broadcast content notification system according to an embodiment of the disclosure.

FIGS. 1 through 10 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the specification will be briefly defined, and embodiments of the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In addition, terms such as "unit" and "module" described in the specification denote a unit that processes at least one function or operation, which may be implemented in hardware or software, or implemented in a combination of hardware and software.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings such that one of ordinary skill in the art may implement the embodiments of the disclosure. However, the disclosure may be implemented in various different forms and is not limited to the embodiments of the disclosure described herein. Also, in the drawings, some parts may be omitted in order to more clearly describe the disclosure, and like reference numerals designate like elements throughout the specification.

In certain embodiments of this disclosure, the term "user" denotes a person who controls functions or operations of a display apparatus by using a control apparatus, and may include a viewer, a manager, or an installation engineer.

FIG. 1 illustrates a diagram for describing a broadcast content notification system according to an embodiment of the disclosure.

Referring to FIG. 1, the broadcast content notification system may include a server 10 and a display apparatus 100.

The server 10, according to an embodiment of the disclosure, may be a server operated by a broadcasting business operator and may store data regarding frames forming, each of pieces of broadcast content (hereinafter, referred to as broadcast content data 20). Alternatively, the server 10 may receive and store the broadcast content data 20 from another external server (for example, a server operated by a broadcasting business operator).

The server 10, according to an embodiment of the disclosure, may extract one or more objects from the broadcast content data 20 and collect and analyze the extracted one or more objects to obtain object information 30. The server 10 may obtain the object information 30 including category information of an object included in a frame, keyword information corresponding to an object, and frequency information by using metadata included in the broadcast content data 20. However, an embodiment of the disclosure is not limited thereto.

The display apparatus 100, according to an embodiment of the disclosure, may be a television (TV), but is not limited thereto and may be implemented, for example, as an electronic apparatus capable of receiving a broadcast signal and displaying an image based on the broadcast signal. For example, the display apparatus 100 may be implemented as various electronic devices such as a mobile phone, a tablet personal computer (PC), a digital camera, a camcorder, a laptop computer, a desktop computer, an electronic book terminal, a digital broadcasting terminal, a personal digital assistant (PDA), a portable multimedia player (PMP), a navigation device, an MP3 player, and a wearable device. The display apparatus 100 may be a fixed type or a movable type. The display apparatus 100 may be a digital broadcasting receiver capable of receiving a digital broadcast. The display apparatus 100 may be implemented as, for example, not a flat display apparatus or a curved display apparatus with a screen having a curvature or a flexible display apparatus with an adjustable curvature. Output definition of the display apparatus 100 may include, for example, high definition (HD), full HD, ultra HD, or a definition clearer than ultra HD.

An operation mode of the display apparatus 100, according to an embodiment of the disclosure, may include a normal mode and a suspended mode. For example, the normal mode may denote a state in which a display of the display apparatus 100 is on and the suspended mode may denote a state in which the display of the display apparatus 100 is off. When the display is on, the display apparatus 100 may be able to reproduce image data. The display may be off when the display apparatus 100 is powered off; and when the display is off, a display screen may be switched to a black screen. Here, display on and display off may be respectively referred to as power on or power off of the display apparatus 100, or as turn on or turn off of the display apparatus 100.

The display apparatus 100 may operate a main processor in the normal mode and operate a sub-processor in the suspended mode. When entering the suspended mode, the display apparatus 100 may operate in a low-power mode by limiting power supply to some components. However, even when entering the suspended mode, power may be separately supplied to a communicator to maintain communication with an external apparatus.

The server 10 and the display apparatus 100, according to an embodiment of the disclosure, may transmit and receive data to and from each other via a communication network.

The communication network, according to an embodiment of the disclosure, may be configured to communicate with at least one of a wired communication network or a wireless communication network. For example, the communication network may be a network using a communication standard corresponding to at least one of wireless local area network (WLAN) (for example, Wi-Fi), Bluetooth, wired Ethernet, infrared (IR), Bluetooth low energy (BLE), ultrasound, or Zigbee.

Referring to FIG. 1, the display apparatus 100, according to an embodiment of the disclosure, may receive the broadcast content data 20 from the server 10 in the normal mode and receive the object information 30 from the server 10 in the suspended mode.

In the normal mode, the display apparatus 100 may extract one or more objects included in frames of broadcast content based on the received broadcast content data 20, and obtain object information about the extracted objects. The display apparatus 100 may determine broadcast content corresponding to a keyword of interest of a user from among pieces of broadcast content, based on the obtained object information.

Meanwhile, in the suspended mode, the display apparatus 100 may determine the broadcast content corresponding to the keyword of interest of the user from among the pieces of broadcast content, based on the received object information 30.

The display apparatus 100, according to an embodiment of the disclosure, may provide the user with information about the broadcast content (content of interest) corresponding to the keyword of interest of the user. For example, in the normal mode, the display apparatus 100 may display the information about the content of interest on the display. In the suspended mode, the display apparatus 100 may turn on the display (switch to the normal mode) and display the information about the content of interest on the display. Alternatively, the display apparatus 100 may transmit the information about the content of interest to an electronic apparatus interworking with the display apparatus 100. Alternatively, the display apparatus 100 may record a content of interest for a pre-set time and store the recorded content of interest. However, an embodiment of the disclosure is not limited thereto.

FIG. 2 illustrates a diagram for describing a method, performed by the display apparatus 100, of collecting and analyzing object information from frame data of broadcast content, according to an embodiment of the disclosure.

Referring to FIG. 2, the display apparatus 100, according to an embodiment of the disclosure, may receive data (broadcast content data) regarding frames forming, each of a plurality of pieces of broadcasting content.

In FIG. 2, for convenience of description, the display apparatus 100 receives first broadcast content data 210 regarding first broadcast content, second broadcast content data 220 regarding second broadcast content, and third broadcast content data 230 regarding third broadcast content. However, an embodiment of the disclosure is not limited thereto. Further, the plurality of pieces of broadcast content may include a greater number of pieces of broadcast content and the broadcast content data may include a greater number of pieces of broadcast content data.

The display apparatus 100 may receive object information 215 corresponding to the first broadcast content, based on the first broadcast content data 210. The display apparatus 100 may extract objects included in frames forming the first broadcast content by using metadata included in the first broadcast content data 210. The display apparatus 100 may determine category information of the objects by analyzing attributes and the like of the extracted objects. The display apparatus 100 may determine keyword information corresponding to the objects when the category information of the objects is determined. The display apparatus 100 may determine information about the number of times each of the objects appears in the first broadcast content (frequency information).

For example, the display apparatus 100 may extract a first object (object 1) from the frames forming the first broadcast content and analyze attributes or the like of the first object to determine that the first object is 'object' and categorized as 'street lamp'. The display apparatus 100 may determine a keyword corresponding to the first object as 'bulb' and determine the number of times (frequency) the first object appears in the frames forming the first broadcast content.

Similarly, the display apparatus 100 may extract a second object (object 2) from the frames forming the first broadcast content and analyze attributes or the like of the second object to determine that the second object is 'person' and categorized as 'singer'. The display apparatus 100 may determine a keyword corresponding to the second object as 'BTS' and determine the number of times (frequency) the second object appears in the frames forming the first broadcast content.

Accordingly, the display apparatus 100 may obtain the object information 215 corresponding to the first broadcast content and obtain, in the same or similar manner, object information 225 corresponding to second broadcast content and object information 235 corresponding to third broadcast content.

The display apparatus 100, according to an embodiment of the disclosure, may determine content of interest of a user from among the first through the third broadcast content, based on the object information 215 corresponding to the first broadcast content, the object information 225 corresponding to the second broadcast content, and the object information 235 corresponding to the third broadcast content.

The display apparatus 100 may determine whether a keyword of interest registered by the user is included in the object information 215 corresponding to the first broadcast content and when the keyword of interest is included in the object information 215, determine whether the first broadcast content is the content of interest, based on frequency information corresponding to the keyword of interest. The display apparatus 100 may determine the content of interest in the same manner by analyzing the object information 225 corresponding to the second broadcast content and the object information 235 corresponding to the third broadcast content.

For example, when the keyword of interest registered by the user is 'BTS', the object information 225 corresponding to the second broadcast content includes 'BTS', and the frequency of 'BTS' is equal to or greater than a pre-set number, the second broadcast content may be determined to be the content of interest of the user. However, an embodiment of the disclosure is not limited thereto.

The display apparatus 100 may determine the content of interest corresponding to the keyword of interest from among pieces of broadcast content broadcasted at a certain time band. For example, when the user sets a certain broadcasting time while registering the keyword of interest, object information corresponding to each of pieces of broadcast content broadcasted at the set certain broadcasting time may be obtained and the content of interest may be determined by using the obtained object information.

The display apparatus 100 may determine the content of interest corresponding to the keyword of interest from among pieces of broadcast content broadcasted at a certain channel. For example, when the user sets a certain channel while registering a keyword of interest, object information corresponding to each of pieces of broadcast content broadcasted at the set certain channel may be obtained and the content of interest may be determined by using the obtained object information.

The display apparatus 100 may determine the content of interest corresponding to the keyword of interest from among pieces of broadcast content of a certain category. For example, when the user sets a category as 'drama' while registering the keyword of interest, object information corresponding to each of pieces of broadcast content categorized as 'drama' may be obtained and the content of interest may be determined by using the obtained object information.

The display apparatus 100 may distinguish commercial content broadcasted between broadcast programs from among the pieces of broadcast content and determine the content of interest from among the pieces of broadcast content corresponding to the broadcast program. For example, object information corresponding to each of the pieces of broadcast content corresponding to the broadcast program may be obtained and the content of interest may be determined by using the obtained object information.

Alternatively, the display apparatus 100 may determine the content of interest from among pieces of commercial content. For example, object information corresponding to each of the pieces of commercial content may be obtained and the content of interest may be determined by using the obtained object information. However, an embodiment of the disclosure is not limited thereto.

In FIG. 2, a method, performed by the display apparatus 100, of obtaining object information by analyzing broadcast content data has been illustrated. However, the server 10 of FIG. 1 may also obtain the object information 30 by analyzing broadcast content data in the same manner.

Figure 3A:
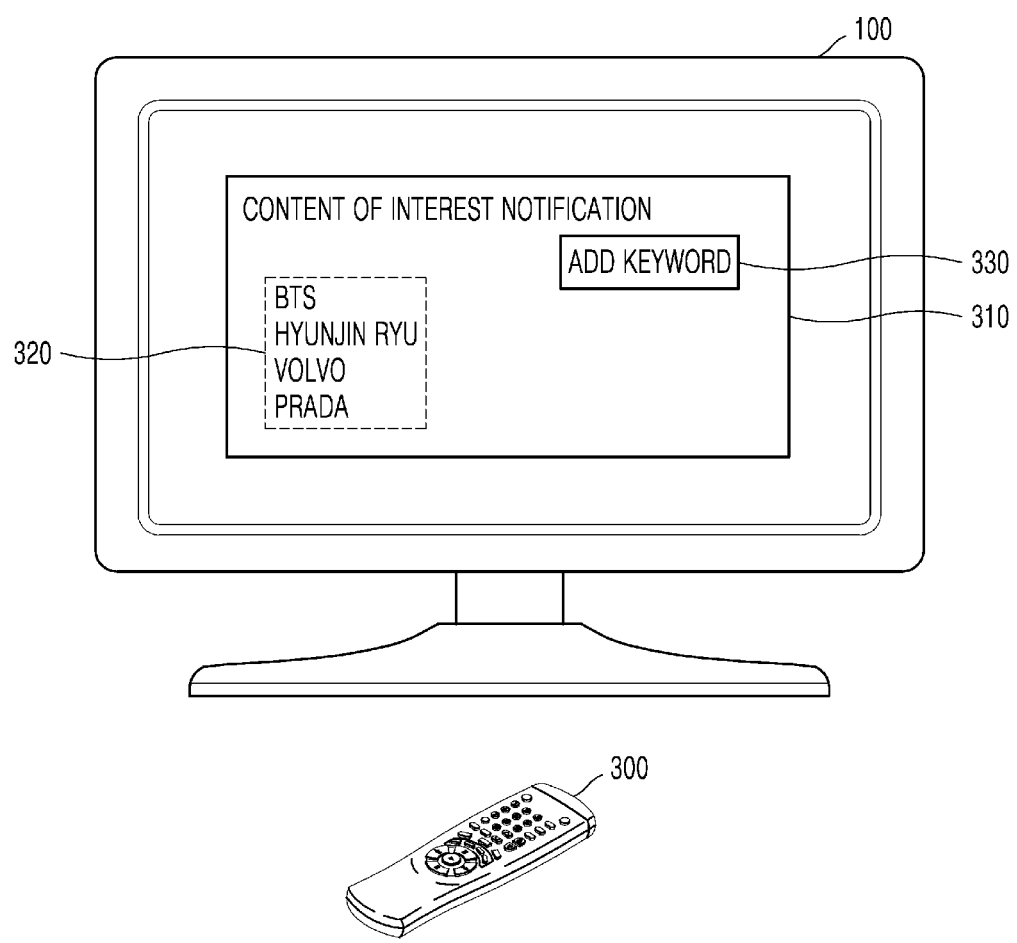
FIGS. 3A and 3B illustrate diagrams for describing a method of registering a keyword of interest in a display apparatus, according to an embodiment of the disclosure.
Figure 3B:
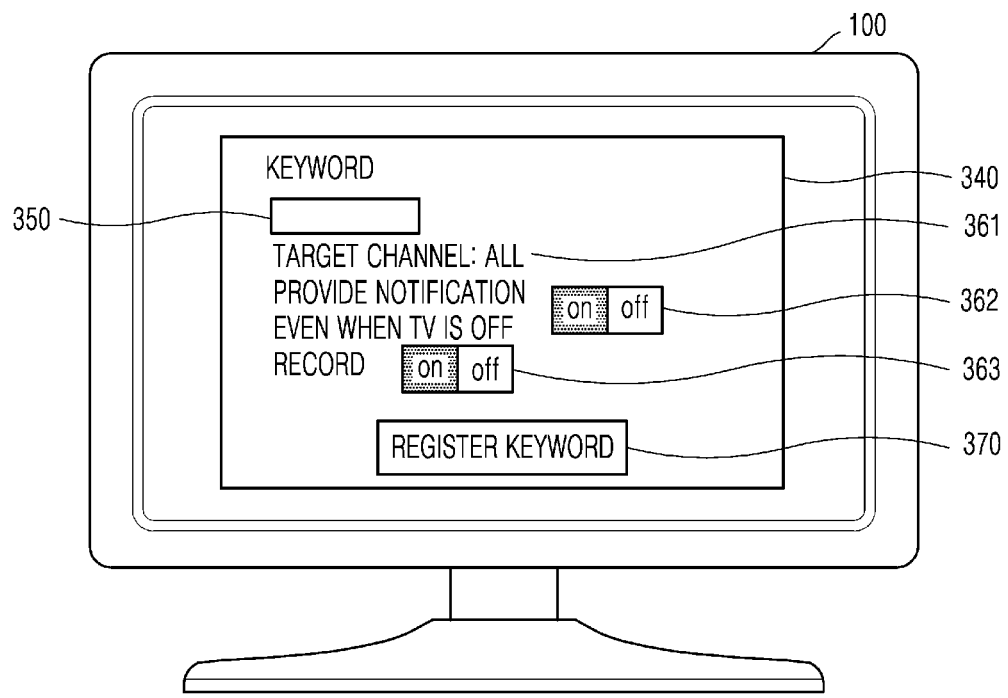

FIGS. 3A and 3B illustrate diagrams for describing a method of registering a keyword of interest in the display apparatus 100, according to an embodiment of the disclosure.

The display apparatus 100, according to an embodiment of the disclosure, may provide a notification function for content of interest of a user. For example, the display apparatus 100 may display a keyword of interest registration screen 310 for registering a keyword of interest as shown in FIG. 3A, based on a user input. The keyword of interest registration screen 310 may include a pre-registered keyword 320 and a keyword adding item 330 for adding a keyword of interest. However, the keyword of interest registration screen 310 of FIG. 3A is an illustrative example, and may be configured in various ways.

The user may use a control apparatus 300 to select the keyword adding item 330. Here, the control apparatus 300 may perform communication (for example, short range communication) with the display apparatus 100 to transmit data or the like to the display apparatus 100. The display apparatus 100 may select an item by receiving a control signal corresponding to a user input (for example, a key or button input of the control apparatus 300) from the control apparatus 300.

When the keyword adding item 330 is selected, the display apparatus 100 may display a keyword input screen 340 as shown in the illustrative example of FIG. 3B.

The keyword input screen 340 may include a keyword input window 350, items 361 through 363 for setting conditions regarding a content of interest notification service, and a keyword registering item 370.

The items 361 through 363 for setting conditions regarding the content of interest notification service may include the item 361 for setting a range of target channels where broadcast content is to be searched for, the item 362 for setting whether to receive a channel notification even when a display is off, and the item 363 for setting whether to record broadcast content corresponding to a keyword. However, an embodiment of the disclosure is not limited thereto.

The user may input a keyword of interest to the keyword input window 350. For example, the keyword of interest may include a program name, a field of interest, a genre of interest, a brand name, a person's name, an object name, or the like, but is not limited thereto.

When a search target channel of broadcast content is set to 'all', the display apparatus 100 may search all broadcast channels for broadcast content corresponding to the keyword of interest of the user. For example, the display apparatus 100 may obtain object information for all broadcast channels and determine content of interest based on the obtained object information.

When the search target channel of the broadcast content is set to a specific channel, the display apparatus 100 may search pieces of broadcast content received via the specific channel for the broadcast content corresponding to the keyword of interest of the user. For example, the display apparatus 100 may obtain object information regarding the pieces of broadcast content received via the specific channel and determine content of interest based on the obtained object information.

When set to receive the channel notification even when the display is off, the display apparatus 100 may turn on the display when the display is turned off and provide information about the content of interest or transmit the information about the content of interest to another electronic apparatus interworking with the display apparatus 100.

When whether to record the broadcast content corresponding to the keyword of interest is set to on, the display apparatus 100 may record and store the content of interest for a pre-set time while the content of interest is broadcasted.

In addition, the display apparatus 100 may set a notification time of the information about the content of interest (for example, when to provide the information about the content of interest based on a broadcast start time of the content of interest), a degree of relevance for determining broadcast content as the content of interest corresponding to the keyword of interest (for example, a threshold appearance number (frequency) for determining the broadcast content as the content of interest), and a method of providing the information about the content of interest, but is not limited thereto.

Figure 4A:
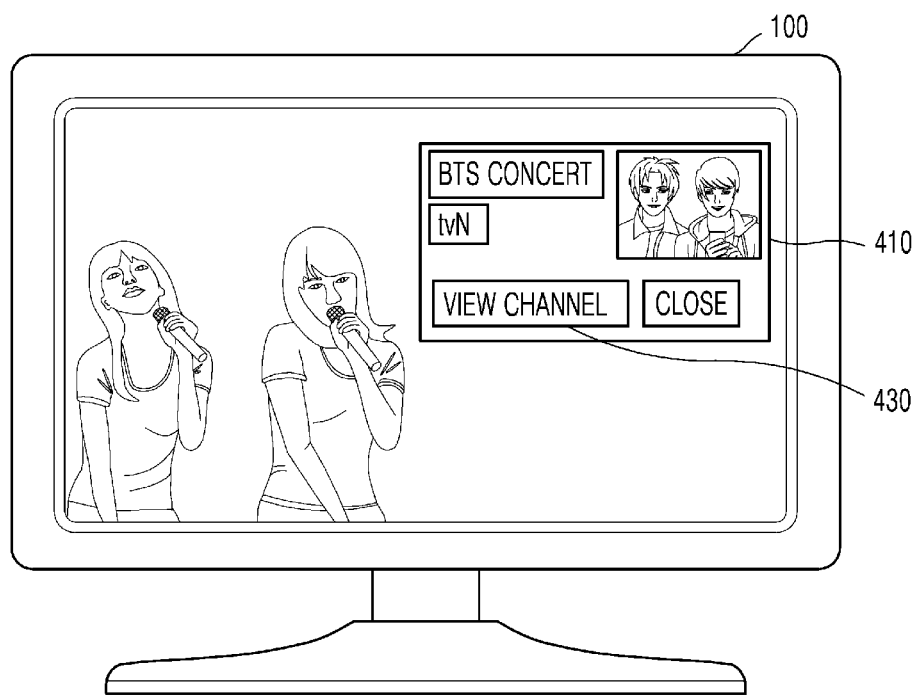
FIGS. 4A and 4B illustrate diagrams of examples of screens of a display apparatus providing information about content of interest, according to an embodiment of the disclosure.
Figure 4B:
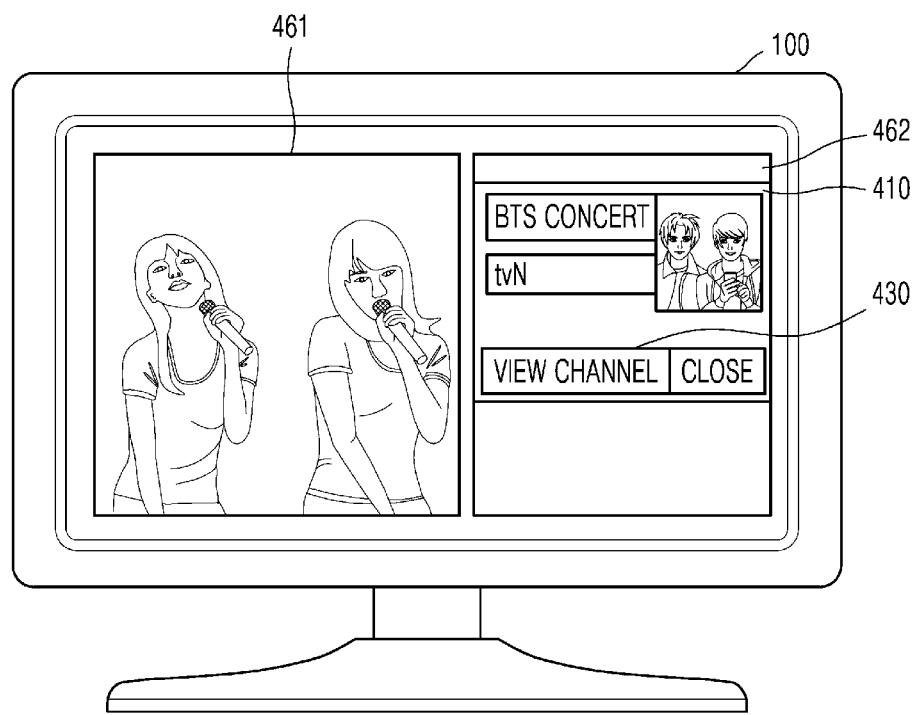

FIGS. 4A and 4B illustrate diagrams of examples of screens of the display apparatus 100 providing information about content of interest, according to an embodiment of the disclosure.

The display apparatus 100, according to an embodiment of the disclosure, may display, on a display, broadcast content being broadcasted on a currently set channel. The display apparatus 100 may display a content of interest notification screen 410 on a part of the display.

When the display apparatus 100 is in a suspended mode, the display apparatus 100 may turn on the display (switch to a normal mode) and display the content of interest notification screen 410 on the display.

For example, as shown in FIG. 4A, the broadcast content being broadcasted on the currently set channel may be displayed on an entire screen of the display while the content of interest notification screen 410 may overlap and be displayed on a partial region of the entire screen.

Alternatively, as shown in FIG. 4B, the entire screen of the display may be split into a plurality of regions and the broadcast content being broadcasted on the currently set channel may be displayed in a first region 461 and the content of interest notification screen 410 may be displayed in a second region 462.

The content of interest notification screen 410 according to an embodiment of the disclosure may include at least one of a name of the content of interest (for example, 'BTS concert'), channel information of the content of interest (for example, 'tvN'), broadcast time information of the content of interest, category information of the content of interest, information about keyword of interest corresponding to the content of interest (for example, 'BTS'), viewing target age information of the content of interest, or a preview image of the content of interest.

The content of interest notification screen 410 may include a channel view item 430, and when an input of selecting the channel view item 430 is received, the display apparatus 100 may end displaying the content of interest notification screen 410, switch a channel to a channel of the content of interest, and display the content of interest on the entire screen. However, an embodiment of the disclosure is not limited thereto.

Figure 5:
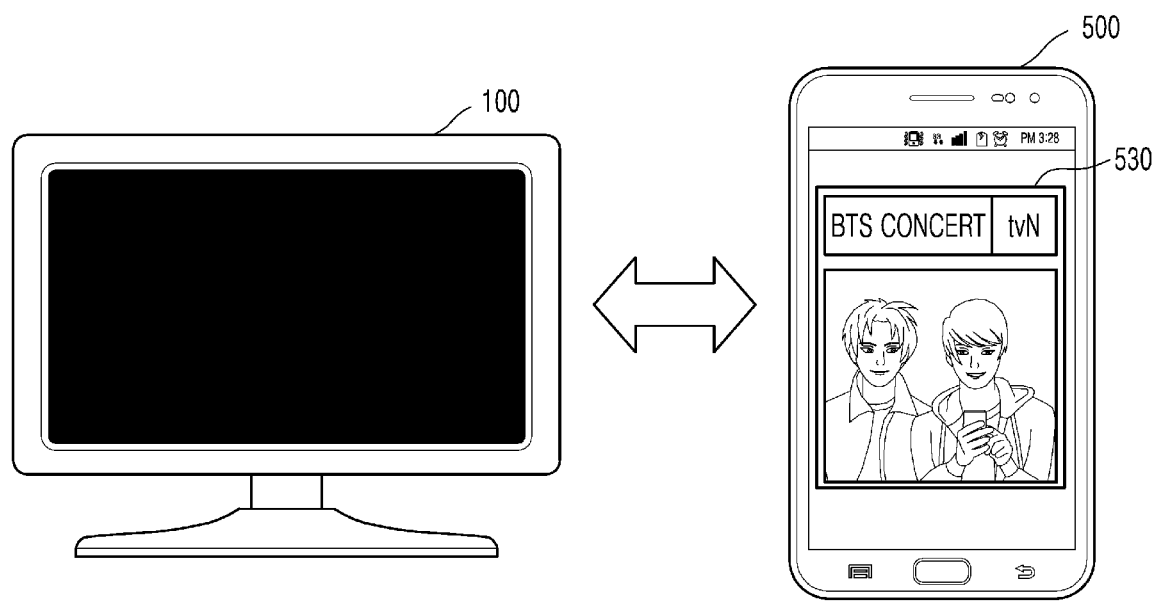
FIG. 5 illustrates a diagram of an example of a display apparatus providing information about content of interest while a display is turned off, according to an embodiment of the disclosure.

FIG. 5 illustrates a diagram of an example of the display apparatus 100 providing information about content of interest while a display is turned off, according to an embodiment of the disclosure.

Referring to FIG. 5, the display of the display apparatus 100, according to an embodiment of the disclosure, may be in an off state. For example, the display may be in a suspended mode by powering off the display apparatus 100 after a keyword of interest is registered while the display is in an on state, but an embodiment of the disclosure is not limited thereto.

As described with reference to FIG. 1, the display apparatus 100 may receive the object information 30 from the suspended mode in the suspended mode and determine the content of interest corresponding to the keyword of interest, based on the object information 30.

The display apparatus 100 may transmit information about the content of interest to another electronic apparatus 500 interworking with the display apparatus 100. For example, the display apparatus 100 may be paired with the electronic apparatus 500, and the display apparatus 100 and the electronic apparatus 500 may transmit and receive data or a control signal to and from each other via a communication network.

The display apparatus 100 may transmit the information about the content of interest to the electronic apparatus 500 and the electronic apparatus 500 may provide the information about the content of interest received from the display apparatus 100. For example, the electronic apparatus 500 may display a content of interest notification screen 530 on a display of the electronic apparatus 500 and output a notification sound via a speaker or output vibration. However, an embodiment of the disclosure is not limited thereto.

A user may power on the display apparatus 100 by using the electronic apparatus 500. For example, upon receiving a channel view input or the like from the user, the electronic apparatus 500 may transmit a 'power on' signal to the display apparatus 100 and the display apparatus 100 may turn on the display by receiving the 'power on' signal. Also, the electronic apparatus 500 may transmit a channel switch signal for switching to a channel corresponding to the content of interest to the display apparatus 100, and the display apparatus 100 may switch a current channel to the channel corresponding to the content of interest by receiving the channel switch signal.

Figure 6:
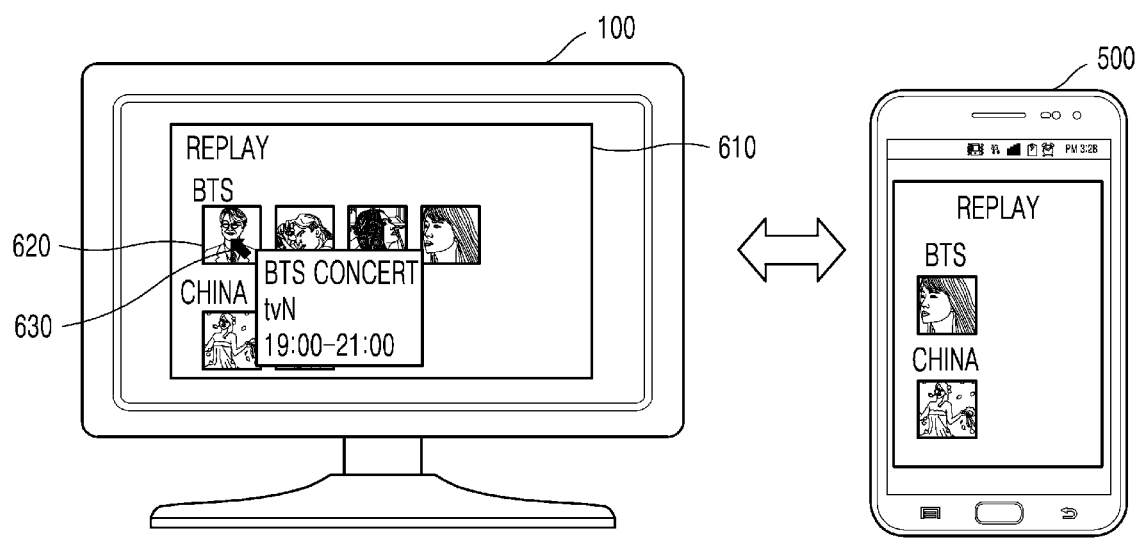
FIG. 6 illustrates a diagram for describing a method, performed by a display apparatus, of providing replay of content of interest, according to an embodiment of the disclosure.

FIG. 6 illustrates a diagram for describing a method, performed by the display apparatus 100, of providing replay of content of interest, according to an embodiment of the disclosure.

Referring to FIG. 6, the display apparatus 100, according to an embodiment of the disclosure, may record and store content of interest while the content of interest is being broadcasted. Here, the display apparatus 100 may start recording at a time when the content of interest is broadcasted, based on information about the content of interest (for example, broadcast time information and broadcast channel information of the content of interest). The display apparatus 100 may perform the recording for the entire time when the content of interest is broadcasted or for a pre-set time, but is not limited thereto.

When the recording is performed on the content of interest, the display apparatus 100 may generate a replay list 610 for the content of interest. Here, the replay list 610 may be generated by categorizing the recorded content of interest according to keywords of interest. For example, as shown in FIG. 6, when the keywords of interest are 'BTS' and 'China', recorded videos of content of interest corresponding to 'BTS' may be categorized into one category and stored, and recorded videos of content of interest corresponding to 'China' may be categorized into one category and stored.

The display apparatus 100 may display the replay list 610 on a display, based on a user input. The replay list 610 may be displayed by being categorized according to keywords of interest. Recorded videos of content of interest may be displayed in icons. Here, the icons may include a thumbnail image indicating the content of interest, a name of the content of interest, or the like, but are not limited thereto. When a cursor 630 is on an icon 620, information about content of interest corresponding to the icon 620 may be displayed. For example, a name of the content of interest, channel information of the content of interest, broadcast time information of the content of interest, and reproduction time information may be displayed.

Upon receiving a user input of selecting the icon 620, the display apparatus 100 may reproduce a recorded video of the content of interest corresponding to the icon 620, which is selected.

Also, the display apparatus 100, according to an embodiment of the disclosure, may transmit the replay list 610 to the electronic apparatus 500 interworking with the display apparatus 100. The user may use the replay list 610 displayed on the electronic apparatus 500 to transmit a control signal enabling the display apparatus 100 to reproduce the recorded video of the content of interest.

Alternatively, the electronic apparatus 500 may reproduce the recorded video of the content of interest.

Figure 7:
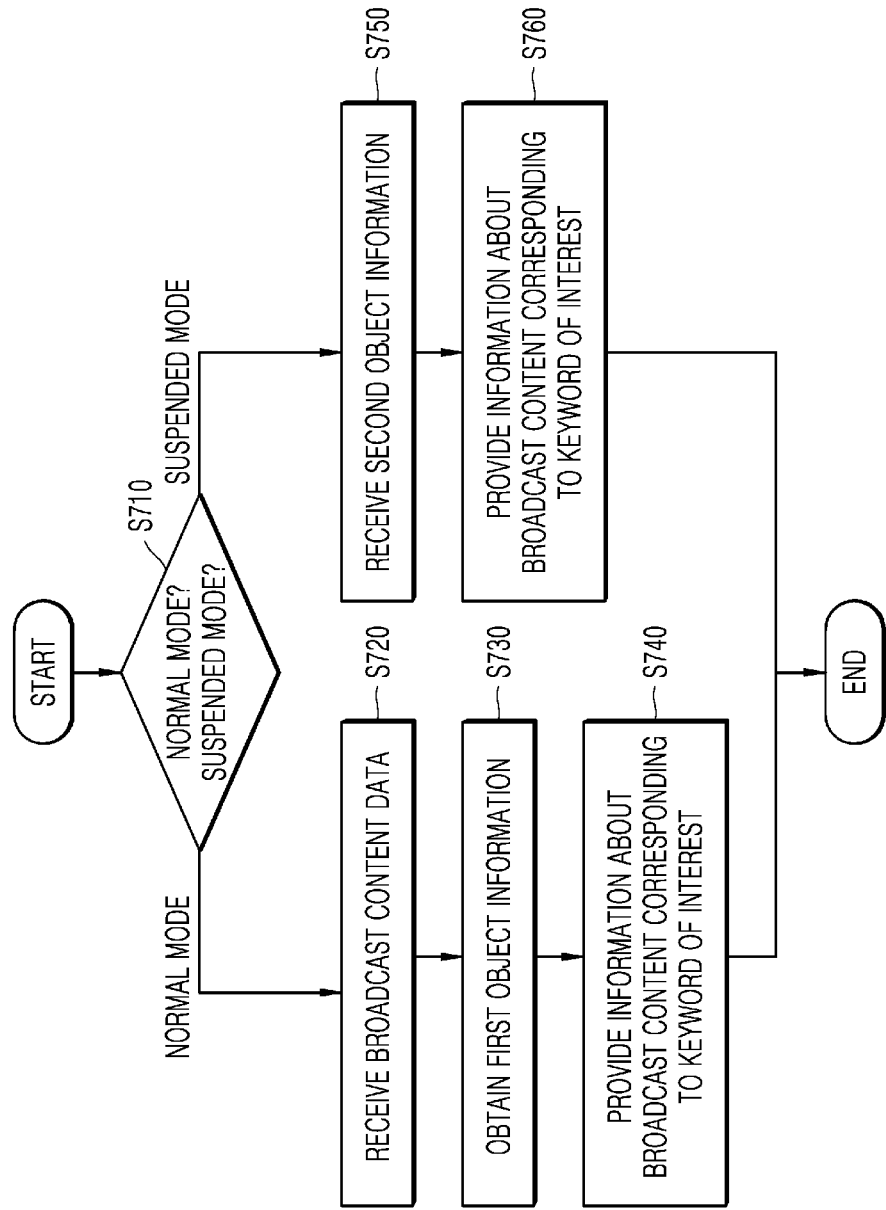
FIG. 7 illustrates a flowchart of an operating method of a display apparatus, according to an embodiment of the disclosure.

FIG. 7 illustrates a flowchart of an operating method of the display apparatus 100, according to an embodiment of the disclosure.

Referring to FIG. 7, in operation S710, the display apparatus 100, according to an embodiment of the disclosure, may determine whether the display apparatus 100 is in a normal mode or a suspended mode.

An operation mode of the display apparatus 100, according to an embodiment of the disclosure, may include a normal mode and a suspended mode. For example, the normal mode may denote a state in which a display of the display apparatus 100 is on and the suspended mode may denote a state in which the display of the display apparatus 100 is off. When the display is on, the display apparatus 100 may be able to reproduce image data.

When the display apparatus 100 is in the normal mode, the display apparatus 100 may receive data (broadcast content data) regarding frames forming a plurality of pieces of broadcast content in operation S720.

The display apparatus 100 may receive first object information based on the received broadcast content data in operation S730. Because a method by which the display apparatus 100 obtains object information has been described in detail with reference to FIG. 2, redundant descriptions thereof are omitted.

The display apparatus 100 may determine broadcast content corresponding to a keyword of interest, based on the obtained first object information. For example, the display apparatus 100 may determine whether the first object information includes a keyword of interest and when the keyword of interest is included, determine whether the corresponding broadcast content is broadcast content corresponding to the keyword of interest, based on frequency information (the number of appearances) of the keyword of interest. When the keyword of interest appears in the corresponding broadcast content a pre-set number of times or more, the corresponding broadcast content may be determined as the broadcast content corresponding to the keyword of interest.

The display apparatus 100 may provide, to a user, information about the broadcast content corresponding to the keyword of interest in operation S740. In the normal mode, the display apparatus 100 may display, on a display, the information about the content of interest in a form of a notification message. Because this has been described in detail with reference to FIGS. 4A and 4B, redundant descriptions thereof are omitted.

Alternatively, the display apparatus 100 may transmit the information about the content of interest to an electronic apparatus interworking with the display apparatus 100. Because this has been described in detail with reference to FIG. 5, redundant descriptions thereof are omitted.

Alternatively, the display apparatus 100 may record the content of interest for a pre-set time and store the recorded content of interest. Because this has been described in detail with reference to FIG. 6, redundant descriptions thereof are omitted.

When entering the suspended mode from the normal mode, the display apparatus 100 may receive second object information that is collected and analyzed by the server 10 in operation S750. As described above with reference to FIG. 1, the server 10 according to an embodiment of the disclosure may obtain the second object information 30, based on the broadcast content data.

The display apparatus 100 may determine the broadcast content corresponding to the keyword of interest, based on the second object information 30 received from the server 10. For example, the display apparatus 100 may determine whether the second object information includes the keyword of interest and when the keyword of interest is included, determine whether the corresponding broadcast content is the broadcast content corresponding to the keyword of interest, based on frequency information (the number of appearances) of the keyword of interest. When the keyword of interest appears in the corresponding broadcast content a pre-set number of times or more, the corresponding broadcast content may be determined as the broadcast content corresponding to the keyword of interest.

The display apparatus 100 may provide, to the user, information about the broadcast content corresponding to the keyword of interest in operation S760. In the suspended mode, the display apparatus 100 may turn on the display (switch to the normal mode) and display the information about the content of interest on the display. Alternatively, the display apparatus 100 may transmit the information about the content of interest to the electronic apparatus interworking with the display apparatus 100. Alternatively, the display apparatus 100 may record the content of interest for a pre-set time and store the recorded content of interest, based on the information about the content of interest. However, an embodiment of the disclosure is not limited thereto.

Figure 8:
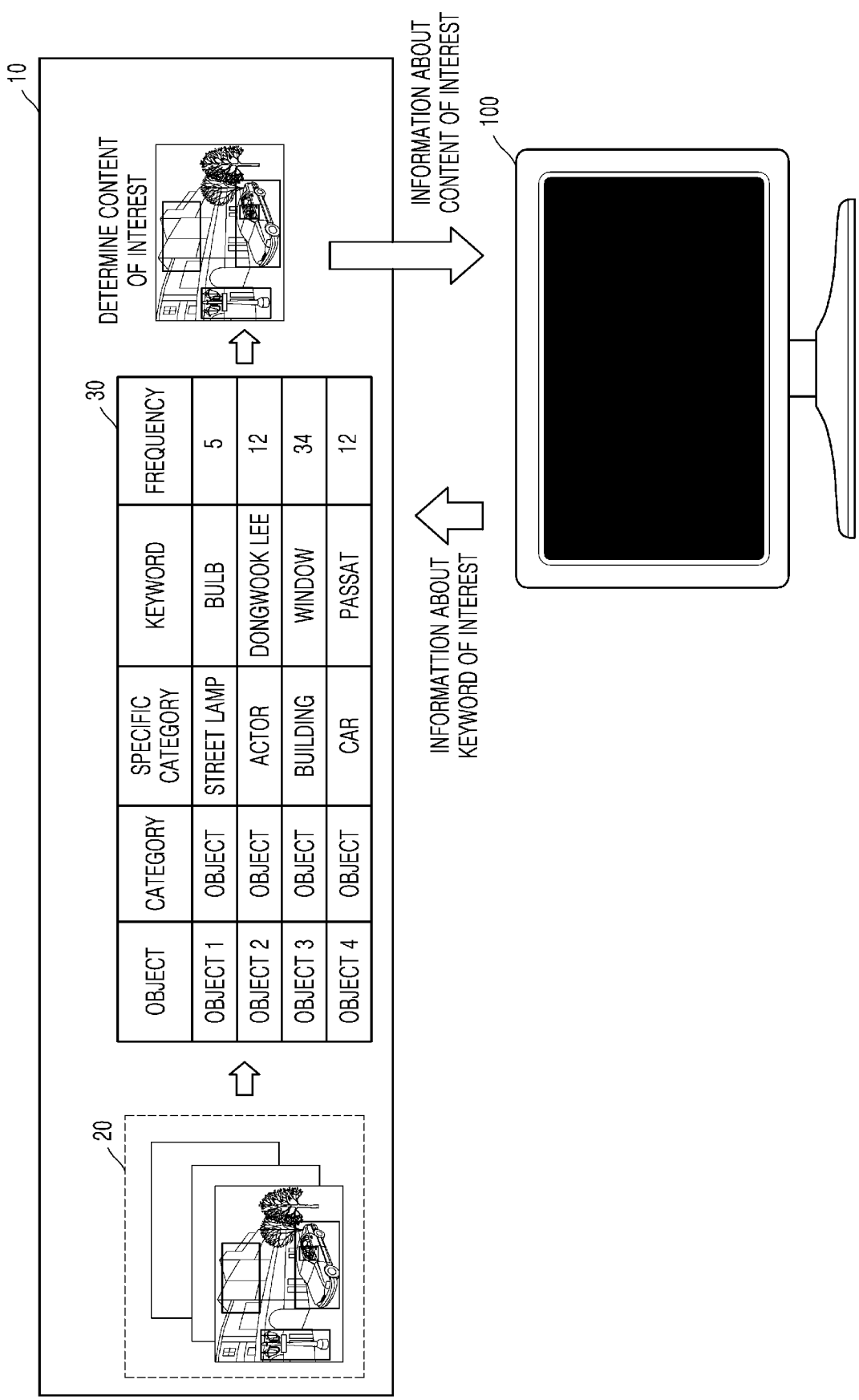
FIG. 8 illustrates a diagram for describing a method, performed by a display apparatus, of providing content of interest of a user, according to an embodiment of the disclosure.

FIG. 8 illustrates a diagram for describing a method, performed by the display apparatus 100, of providing content of interest of a user, according to an embodiment of the disclosure.

Referring to FIG. 8, when entering a suspended mode from a normal mode, the display apparatus 100, according to an embodiment of the disclosure, may transmit, to the server 10, information about a keyword of interest pre-registered in the display apparatus 100. For example, when a display is turned off according to power off while operating in the normal mode, a display screen is switched to a black screen and the display apparatus 100 may enter the suspended mode. The display apparatus 100 may operate in a low-power mode in the suspended mode, and power may be separately supplied to a communicator to maintain a communication connection with the server 10 even in the suspended mode. Accordingly, the display apparatus 100 may transmit, to the server 10, information about the pre-registered keyword of interest via the communicator.

The server 10 according to an embodiment of the disclosure may extract one or more objects from the broadcast content data 20 and collect and analyze the extracted one or more objects to obtain object information 30. The server 10 may obtain the object information 30 including category information of an object included in a frame, keyword information corresponding to an object, and frequency information by using metadata included in the broadcast content data 20.

The server 10 may determine broadcast content (content of interest) corresponding to a keyword of interest, based on information about keyword of interest received from the display apparatus 100 and the object information 30. The server 10 may determine whether the object information 30 includes a keyword of interest included in the information about keyword of interest, and when the keyword of interest is included, determine whether the corresponding broadcast content is broadcast content corresponding to the keyword of interest, based on frequency information (the number of appearances) of the keyword of interest. When the keyword of interest appears in the corresponding broadcast content a pre-set number of times or more, the corresponding broadcast content may be determined as the broadcast content (content of interest) corresponding to the keyword of interest.

The server 10 may transmit information about the content of interest to the display apparatus 100. In the normal mode, the display apparatus 100 may display the information about the content of interest on the display, and in the suspended mode, the display apparatus 100 may turn on the display (switch to the normal mode) and display the information about the content of interest on the display. Alternatively, the display apparatus 100 may transmit the information about the content of interest to an electronic apparatus interworking with the display apparatus 100. Alternatively, the display apparatus 100 may record the content of interest for a pre-set time and store the recorded content of interest, based on the information about the content of interest. However, an embodiment of the disclosure is not limited thereto.

Figure 9:
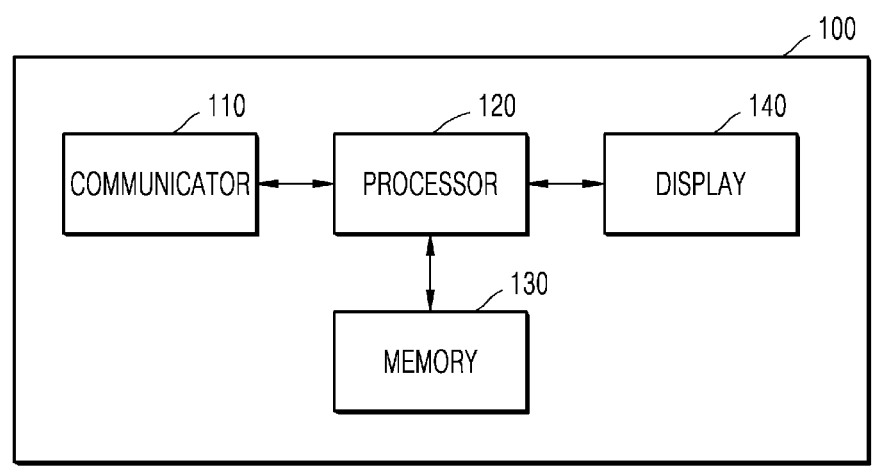
FIG. 9 illustrates a block diagram of a configuration of a display apparatus according to an embodiment of the disclosure.

FIG. 9 illustrates a block diagram of a configuration of the display apparatus 100 according to an embodiment of the disclosure.

Referring to FIG. 9, the display apparatus 100, according to an embodiment of the disclosure, may include a communicator 110, a processor 120, a memory 130, and a display 140.

The communicator 110 according to an embodiment of the disclosure may transmit and receive data or a signal to and from an external apparatus (for example, a control apparatus or a server) by control of the processor 120. The communicator 110 may transmit and receive the data or signal via at least one of wireless local area network (WLAN) (for example, Wi-Fi), Bluetooth, wired Ethernet, infrared (IR), Bluetooth low energy (BLE), ultrasound, or Zigbee, according to a performance and structure of the display apparatus 100. Here, the communicator 110 may include at least one communication module capable of transmitting and receiving data according to communication standards corresponding to WLAN (Wi-Fi), Bluetooth, wired Ethernet, IR, BLE, ultrasound, and Zigbee.

The communicator 110 according to an embodiment of the disclosure may use the same communication module (for example, a Wi-Fi module) to transmit and receive the data or signal to and from the control apparatus or the server. According to an embodiment of the disclosure, a module for performing communication with the control apparatus (for example, a Bluetooth module or IR module) may be different from a module for performing communication with the server (for example, an Ethernet module or a Wi-Fi module).

The processor 120 according to an embodiment of the disclosure may control all operations of the display apparatus 100. The processor 120 may control other components included in the display apparatus 100 such that a certain operation is performed.

The processor 120 according to an embodiment of the disclosure may execute one or more programs stored in the memory 130. The processor 120 may include a single core, a dual core, a triple core, a quad core, or a multiple core. The processor 120 may include a plurality of processors.

The memory 130 according to an embodiment of the disclosure may store various types of data, programs, or applications for driving and controlling the display apparatus 100. The memory 130 according to an embodiment of the disclosure may store a plurality of pieces of broadcast content data, object information, and a keyword of interest of a user.

The program stored in the memory 130 may include one or more instructions. The program (one or more instructions) or application stored in the memory 130 may be executed by the processor 120.

The processor 120 according to an embodiment of the disclosure may control the communicator 110 to receive data (broadcast content data) regarding frames forming a plurality of pieces of broadcast content, when the display apparatus 100 is in a normal mode.

The processor 120 may obtain object information corresponding to each of the plurality of pieces of broadcast content, based on the received broadcast content data. Here, the object information may include at least one of frequency, keyword information, or category information regarding each of one or more objects included in the frames forming the broadcast content.

The processor 120 may determine broadcast content corresponding to a keyword of interest, based on the obtained object information. The processor 120 may determine whether the object information includes the keyword of interest of the user and when the keyword of interest is included, determine whether the corresponding broadcast content is broadcast content corresponding to the keyword of interest, based on frequency information (the number of appearances) of the keyword of interest. When the keyword of interest appears in the corresponding broadcast content a pre-set number of times or more, the corresponding broadcast content may be determined as the broadcast content corresponding to the keyword of interest.

Also, when the display apparatus 100 is in a suspended mode, the processor 120 may control the communicator 110 to receive object information collected and analyzed in the server 10. The processor 120 may determine the broadcast content corresponding to the keyword of interest, based on the object information received from the server 10.

The processor 120 may provide, to the user, information about the broadcast content (content of interest) corresponding to the keyword of interest. The processor 120 may control the display 140 to display the information about the content of interest in a form of a notification message. In the suspended mode, the display 140 may be turned on and the information about the content of interest may be displayed on the display 140. The processor 120 may control the communicator 110 to transmit the information about the content of interest to an electronic apparatus interworking with the display apparatus 100. The processor 120 may record the content of interest for a pre-set time and store the recorded content of interest. However, an embodiment of the disclosure is not limited thereto.

The display 140 according to an embodiment of the disclosure may generate a driving signal by converting an image signal, a data signal, an on-screen display (OSD) signal, or a control signal processed by the processor 120. The display 140 may be implemented as a plasma display panel (PDP), a liquid crystal display (LCD), an organic light-emitting diode (OLED) display, or a flexible display, or may be implemented as a 3-dimensional (3D) display. The display 140 may be configured as a touch screen to be used as an input device as well as an output device.

The display 140 according to an embodiment of the disclosure may display a keyword of interest registration screen, a notification message screen including information about content of interest, and a replay screen for replaying recorded and stored content of interest. However, an embodiment of the disclosure is not limited thereto.

Figure 10:
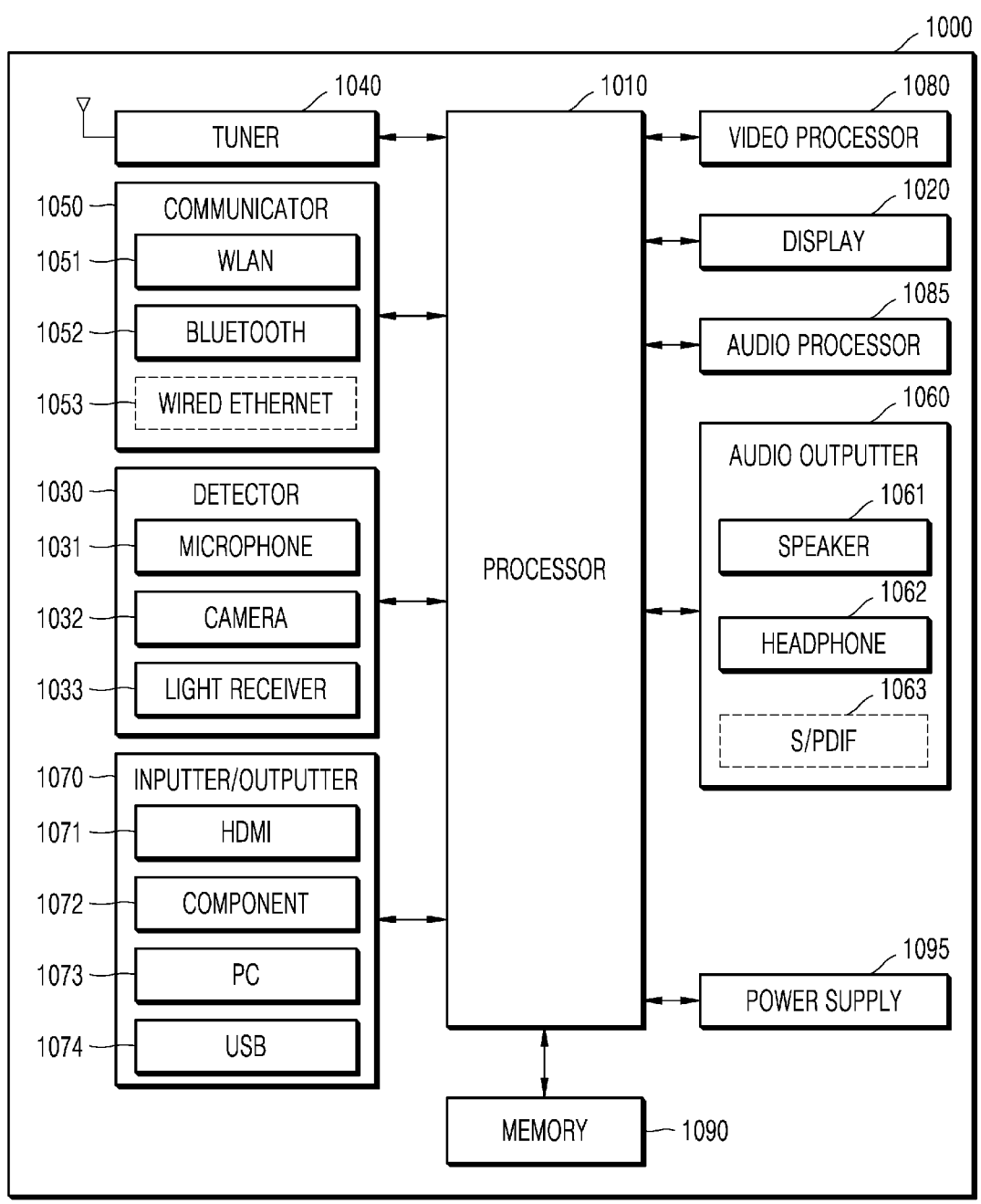
FIG. 10 illustrates a block diagram of a configuration of a display apparatus according to another embodiment of the disclosure.

FIG. 10 illustrates a block diagram of a configuration of a display apparatus 1000 according to another embodiment of the disclosure.

The display apparatus 1000 of FIG. 1 may be an example of the display apparatus 100 described with reference to FIGS. 1 through 9.

Referring to FIG. 10, the display apparatus 1000 according to an embodiment of the disclosure may include a tuner 1040, a processor 1010, a display 1020, a communicator 1050, a detector 1030, an inputter/outputter 1070, a video processor 1080, an audio processor 1085, an audio outputter 1060, a memory 1090, and a power supply 1095.

The communicator 1050, the processor 1010, the memory 1090, and the display 1020 of FIG. 10 respectively correspond to the communicator 110, the processor 120, the memory 130, and the display 140 of FIG. 9, and thus redundant descriptions thereof are omitted.

The tuner 1040 according to an embodiment of the disclosure may tune and select a frequency of a channel to be received by the display apparatus 1000 among many radio wave components by performing amplification, mixing, and resonance on a broadcast signal received via wires or wirelessly. The broadcast signal includes audio, video, and additional information (for example, an electronic program guide (EPG)).

The tuner 1040 may receive a broadcast signal from various sources, such as terrestrial broadcasting, cable broadcasting, satellite broadcasting, and Internet broadcasting. The tuner 1040 may receive a broadcast signal from a source such as analog broadcasting or digital broadcasting.

The communicator 1050 according to an embodiment of the disclosure may transmit and receive data or a signal to and from an external apparatus or server by control of the processor 1010. The processor 1010 may transmit/receive content to/from an external apparatus connected via the communicator 1050, download an application from the external apparatus, or perform web browsing.

The communicator 1050 may include a module combination including one or more of a WLAN 1051, Bluetooth 1052, and wired Ethernet 1053.

The video processor 1080 performs processes on video data received by the display apparatus 1000. The video processor 1080 may perform various image processes, such as decoding, scaling, noise filtering, frame rate converting, and resolution converting, on the video data.

The detector 1030 detects the voice of a user, an image of the user, or an interaction of the user, and may include a microphone 1031, a camera 1032, and a light receiver 1033.

The microphone 1031 receives voice uttered by the user. The microphone 1031 may convert the received voice into an electric signal and output the electric signal to the processor 1010. The user's voice may include, for example, voice corresponding to a menu or function of the display apparatus 1000.

The camera 1032 may receive an image (for example, consecutive frames) corresponding to motion of the user including a gesture within a camera recognition range. The processor 1010 may select a menu displayed on the display apparatus by using a received recognition result motion or perform control corresponding to the recognition result.

The light receiver 1033 receives an optical signal (including a control signal) received from an external control apparatus via a light window (not shown) of a bezel of the display 1020. The light receiver 1033 may receive an optical signal corresponding to a user input (for example, touch, press, touch gesture, voice, or motion) from a control apparatus. A control signal may be extracted from the received light signal under control of the processor 1010.

The inputter/outputter 1070 receives video (for example, a moving image), audio (for example, voice or music), and additional information (for example, EPG) from the outside of the display apparatus 1000 under control of the processor 1010. Alternatively, the inputter/outputter 1070 may transmit, to an external apparatus, video, audio, and additional information by control of the processor 1010. The inputter/outputter 1070 may include one of a high-definition multimedia interface (HDMI) port 1071, a component jack 1072, a PC port 1073, and a universal serial bus (USB) port 1074. The inputter/outputter 1070 may include a combination of the HDMI port 1071, the component jack 1072, the PC port 1073, and the USB port 1074. In addition, the inputter/outputter 1070 may include a display port (DP), a thunderbolt port, or the like.

The processor 1010 controls all operations of the display apparatus 1000 and signal flow between internal components of the display apparatus 1000, and performs a function of processing data. When there is a user input or a pre-set and stored condition is satisfied, the processor 1010 may execute an operation system (OS) and various applications stored in the memory 1090.

The processor 1010 may include random access memory (RAM) storing a signal or data input from the outside of the display apparatus 1000 or used as a storage area corresponding to various tasks performed by the display apparatus 1000, read-only memory (ROM) storing a control program for control of the display apparatus 1000, and a processor.

The processor 1010 may include a graphics processing unit (GPU) (not shown). The GPU generates a screen including various objects, such as an icon, an image, or text, by using an operator (not shown) and a renderer (not shown). The operator calculates attribute values such as coordinate values, shapes, sizes, and colors of objects to be displayed according to layout of a screen by using a user input detected via the detector 1030. The renderer generates a screen of various layouts including objects based on the attribute values calculated by the operator. The screen generated by the renderer is displayed within a display area of the display 1020.

The audio processor 1085 performs a process on audio data. The audio processor 1085 may perform various processes, such as decoding, amplification, or noise filtering, on the audio data. The audio processor 7085 may include a plurality of audio processing modules to process audio corresponding to a plurality of pieces of content.

The audio outputter 1060 outputs audio included in a broadcast signal received via the tuner 1040 under control of the processor 1010. The audio outputter 1060 may output the audio (for example, voice or other sound) input via the communicator 1050 or the inputter/outputter 1070. The audio outputter 1060 may output audio stored in the memory 1090 under control of the processor 1010. The audio outputter 1060 may include at least one of a speaker 1061, a headphone output terminal 1062, or a Sony/Philips digital interface (S/PDIF) terminal 1063. The audio outputter 1060 may include a combination of the speaker 1061, the headphone output terminal 1062, and the S/PDIF terminal 1063.

The power supply 1095 supplies power input from an external power source to components inside the display apparatus 1000 under control of the processor 1010. The power supply 1095 may supply power output from one or more batteries (not shown) located inside the display apparatus 1000 to the components inside the display apparatus 1000 under control of the processor 1010.

The memory 1090 may store various types of data, programs, or applications for driving and controlling the display apparatus 1000 under control of the processor 1010. The memory 1090 may include a broadcast receiving module, a channel control module, a volume control module, a communication control module, a voice recognition module, a motion recognition module, a light receiving module, a display control module, an audio control module, an external input control module, a power control module, a power control module of an external apparatus connected wirelessly (for example, Bluetooth), a voice database (DB), or a motion DB, which is not shown. Modules and DBs of the memory 1090 may be implemented in a form of software to perform a broadcast receiving control function, a channel control function, a volume control function, a communication control function, a voice recognition function, a motion recognition function, a light receiving control function, a display control function, an audio control function, an external input control function, a power control function, or power control function of an external apparatus connected wirelessly (for example, Bluetooth), in the display apparatus 1000. The processor 1010 may perform each function by using the software stored in the memory 1090.

The block diagrams of the display apparatuses 100 and 1000 of FIGS. 9 and 10 are block diagrams according to embodiments of the disclosure. The components may be integrated, a component may be added, or the component may be omitted based on the specification of the display apparatus 100 or 1000. In other words, two or more components may be integrated into one component or one component may be divided into two or more components. Also, a function performed by each block is presented as an illustrative example for describing embodiments of the disclosure and specific operations or apparatuses do not limit the scope of right of the disclosure.

An operating method of a broadcast receiving apparatus, according to an embodiment of the disclosure, may be recorded on a computer-readable recording medium by being implemented in a form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical code prepared by a compiler, and high-level languages executable by a computer by using an interpreter.

Furthermore, an operating method of a display apparatus, according to embodiments of the disclosure, may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program that is electronically distributable through a manufacturer of the broadcast receiving apparatus or an electronic market (for example, Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a client apparatus in a system including the server and the client apparatus. Alternatively, when there is a third device, e.g., a smartphone, that communicates with the server or the client apparatus, the computer program product may include a storage medium of the third device. Alternatively, the computer program product may include the software program transmitted from the server to the client apparatus or the third device, or transmitted from the third device to the client apparatus.

In this case, one of the server, the client apparatus, and the third device may perform a method according to embodiments of the disclosure by executing the computer program product. Alternatively, two or more of the server, the client apparatus, and the third device may execute the computer program product to perform the method according to the embodiments of the disclosure in a distributed fashion.

For example, the server, for example, a cloud server or an artificial intelligence server, may execute the computer program product stored in the server to control the client apparatus communicating and connected to the server to perform the method according to the embodiments of the disclosure.

Because a display apparatus according to an embodiment of the disclosure searches for and provides broadcast content desired by a user by collecting and analyzing an object appearing on a broadcast screen of the broadcast content, the user does not need to identify details of the broadcast content while switching channels or identify EPG information.

The user may receive information about broadcast content corresponding to a keyword of interest regardless of on/off of a display.

Even while the user is watching another channel, the information about the broadcast content corresponding to the keyword of interest is provided, and thus the user may watch the corresponding broadcast content.

Accordingly, user convenience may be improved.

While the embodiments of the disclosure have been particularly shown and described in detail, it will be understood by one of ordinary skill in the art that various changes in form and details may be made therein without departing from the spirit and scope of the disclosure as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A display apparatus comprising:
   a communicator configured to communicate with an external apparatus;
   a display;
   a memory storing one or more instructions; and
   a processor coupled to the memory and the communicator, wherein the processor is configured to execute the one or more instructions stored in the memory to:
   control the communicator to receive data regarding frames forming each of a plurality of pieces of broadcast content in a normal mode in which the display is in an on state;
   extract first object information about one or more objects included in a frame, based on the data regarding the frames;
   determine a broadcast content corresponding to a keyword of interest of a user from among the plurality of pieces of broadcast content, based on the first object information;
   control the display to display information about the broadcast content corresponding to the keyword of interest of the user; and
   in response to entering a suspended mode, in which the display is in an off state, from the normal mode:
   control the communicator to receive second object information about the one or more objects from the external apparatus while in the suspended mode;
   determine the broadcast content corresponding to the keyword of interest of the user from among the plurality of pieces of broadcast content, based on the second object information; and
   provide the information about the broadcast content corresponding to the keyword of interest,
   wherein each of the first object information and the second object information comprise keyword information corresponding to each of one or more objects included in the frames and appearance frequency information corresponding to the keyword information,
   wherein for a respective object, which is from among the one or more objects included in the frames,
   the corresponding keyword information includes a name associated with the respective object; and
   the appearance frequency information includes a number of times the respective object appears in the broadcast content.

2. The display apparatus of claim 1, wherein the processor is further configured to execute the one or more instructions to:
   based on the first object information and at least one of broadcast time information, channel information, or category information of each of the plurality of pieces of broadcast content, determine the broadcast content corresponding to the keyword of interest from among the plurality of pieces of broadcast content.

3. The display apparatus of claim 1, wherein the information about the broadcast content further comprises at least one of channel information, broadcast time information, category information, viewing target age information, or a broadcast content name of the broadcast content.

4. The display apparatus of claim 1, wherein the processor is further configured to execute the one or more instructions to:
in response to detecting the display is in the off state:
turn on the display; and
control the display that is turned on to display the information about the broadcast content corresponding to the keyword of interest.

5. The display apparatus of claim 1, wherein the processor is further configured to execute the one or more instructions to:
control the communicator to transmit the information about the broadcast content corresponding to the keyword of interest to an electronic apparatus interworking with the display apparatus.

6. The display apparatus of claim 1, wherein the processor is further configured to execute the one or more instructions to:
record the broadcast content corresponding to the keyword of interest for a pre-set time; and
store the recorded broadcast content corresponding to the keyword of interest for a pre-set time in the memory.

7. The display apparatus of claim 1, wherein the processor is further configured to:
execute the one or more instructions to register the keyword of interest by receiving information about the keyword of interest,
wherein the information about the keyword of interest comprises at least one of information about a target channel where the keyword of interest is to be searched for, a notification method of the broadcast content corresponding to the keyword of interest, or information about whether to record the broadcast content corresponding to the keyword of interest.

8. The display apparatus of claim 1, wherein the processor is further configured to execute the one or more instructions to:
control the communicator to transmit the keyword of interest to the external apparatus in the suspended mode, receive the information about the broadcast content corresponding to the keyword of interest from the external apparatus, and provide the information about the broadcast content.

9. The display apparatus of claim 1, wherein:
each of the first object information and the second object information further comprise a category information of each of the one or more objects included in the frames; and
the processor is further configured to execute the one or more instructions to determine the keyword information corresponding to the one or more objects included in the frames that corresponds to the category information of the objects, respectively.

10. An operating method of a display apparatus, the operating method comprising:
receiving, by the display apparatus, data regarding frames forming for each of a plurality of pieces of broadcast content in a normal mode in which a display is in an on state;
extracting, by the display apparatus, first object information about one or more objects included in frames, based on the data regarding the frames;
determining a broadcast content corresponding to a keyword of interest of a user from among the plurality of pieces of broadcast content, based on the first object information;
displaying by the display apparatus, information about the broadcast content corresponding to the keyword of interest of the user;
in response to entering a suspended mode, in which the display is in an off state, from the normal mode:
receiving, by the display apparatus, second object information about the one or more objects from an external apparatus while in the suspended mode;
determining the broadcast content corresponding to the keyword of interest of the user from among the plurality of piece of broadcast content, based on the second object information; and
providing, by the display apparatus, the information about the broadcast content corresponding to the keyword of interest,
wherein each of the first object information and the second object information comprise keyword information corresponding to each of one or more objects included in the frames and appearance frequency information corresponding to the keyword information,
wherein for a respective object, which is from among the one or more objects included in the frames,
the corresponding keyword information includes a name associated with the respective object; and
the appearance frequency information includes a number of times the respective object appears in the broadcast content.

11. The operating method of claim 10, further comprising:
detecting, by the display apparatus, whether the display is in the normal mode or the suspended mode.

12. The operating method of claim 10, wherein determining the broadcast content corresponding to the keyword of interest of the user from among the plurality of piece of broadcast content, based on the first object information, further comprises:
determining, by the display apparatus, the broadcast content corresponding to the keyword of interest from among the plurality of pieces of broadcast content, based on the first object information and at least one of broadcast time information, channel information, or category information of each of the plurality of pieces of broadcast content.

13. The operating method of claim 10, wherein the information about the broadcast content further comprises at least one of channel information, broadcast time information, category information, viewing target age information, or a broadcast content name of the broadcast content.

14. The operating method of claim 10, wherein the providing of the information about the broadcast content corresponding to the keyword of interest further comprises:
turning on the display; and
displaying the information about the broadcast content corresponding to the keyword of interest on the display that is turned on.

15. The operating method of claim 10, wherein the providing of the information about the broadcast content corresponding to the keyword of interest, further comprises:
transmitting, by the display apparatus, the information about the broadcast content corresponding to the keyword of interest to an electronic apparatus interworking with the display apparatus.

16. A non-transitory computer-readable medium comprising instructions, that when executed by a processor of a display apparatus, cause the display apparatus to;
receive data regarding frames forming for each of a plurality of pieces of broadcast content in a normal mode in which a display is in an on state;
extract first object information about one or more objects included in a frame, based on the data regarding the frames forming;
determine a broadcast content corresponding to a keyword of interest of a user from among the plurality of pieces of broadcast content, based on the first object information;
display information about the broadcast content corresponding to the keyword of interest of the user;
in response to entering a suspended mode, in which the display is in an off state, from the normal mode:
receive second object information about the one or more objects from an external apparatus while in the suspended mode;
determine the broadcast content corresponding to the keyword of interest of the user from among the plurality of pieces of broadcast content, based on the second object information; and
provide the information about the broadcast content corresponding to the keyword of interest,
wherein each of the first object information and the second object information comprise keyword information corresponding to each of one or more objects included in the frames and appearance frequency information corresponding to the keyword information,
wherein for a respective object, which is from among the one or more objects included in the frames,
the corresponding keyword information includes a name associated with the respective object; and
the appearance frequency information includes a number of times the respective object appears in the broadcast content.

* * * * *